(12) United States Patent
Kutsubo et al.

(10) Patent No.: US 9,568,093 B2
(45) Date of Patent: Feb. 14, 2017

(54) HYDRAULIC CONTROL DEVICE

(71) Applicant: AISIN AW CO., LTD., Anjo-shi, Aichi-ken (JP)

(72) Inventors: Hiroyuki Kutsubo, Anjo (JP); Yoshimitsu Hyodo, Nishio (JP); Kenichi Tsuchida, Nishio (JP); Naoyuki Fukaya, Okazaki (JP); Kazunori Ishikawa, Tokyo (JP)

(73) Assignee: AISIN AW CO., LTD., Anjo (JP)

( * ) Notice: Subject to any disclaimer, the term of this patent is extended or adjusted under 35 U.S.C. 154(b) by 0 days.

(21) Appl. No.: 14/652,349

(22) PCT Filed: Jan. 20, 2014

(86) PCT No.: PCT/JP2014/051022
§ 371 (c)(1),
(2) Date: Jun. 15, 2015

(87) PCT Pub. No.: WO2014/112634
PCT Pub. Date: Jul. 24, 2014

(65) Prior Publication Data
US 2015/0323063 A1 Nov. 12, 2015

(30) Foreign Application Priority Data
Jan. 18, 2013 (JP) ................. 2013-007653

(51) Int. Cl.
*F16H 61/00* (2006.01)
*F16H 61/02* (2006.01)
*F16H 61/686* (2006.01)

(52) U.S. Cl.
CPC ...... *F16H 61/0031* (2013.01); *F16H 61/0206* (2013.01); *B60Y 2300/18016* (2013.01); *F16H 61/686* (2013.01); *F16H 2061/004* (2013.01); *F16H 2200/0052* (2013.01); *F16H 2200/2007* (2013.01); *F16H 2200/2023* (2013.01);
(Continued)

(58) Field of Classification Search
CPC ...................... F16H 61/0031; F16H 61/0206
See application file for complete search history.

(56) References Cited

U.S. PATENT DOCUMENTS

2012/0144818 A1   6/2012   Shimizu et al.
2012/0234645 A1   9/2012   Shimizu et al.

FOREIGN PATENT DOCUMENTS

JP   2006283809 A   10/2006
JP   2012122560 A    6/2012
JP   2012193827 A   10/2012

OTHER PUBLICATIONS

Apr. 28, 2014 International Search Report issued in International Application No. PCT/JP2014/051022.

*Primary Examiner* — Derek D Knight
(74) *Attorney, Agent, or Firm* — Oliff PLC

(57) ABSTRACT

A hydraulic control device includes a C1 relay valve 70 whose state is switched based on a signal pressure that is generated based on a line pressure PL, and a check valve 80 attached to a drain oil passage L7. A set pressure of the check valve 80 is adjusted to an oil pressure that is lower than the maximum oil pressure obtained by discharge capability of an electromagnetic pump 60 and higher than an SL1 pressure Psl1 remaining in a hydraulic servo of a clutch C1 when the state of the C1 relay valve 70 is switched after a mechanical oil pump 42 is stopped. Operation of the electromagnetic pump 60 is started before the state of the C1 relay valve 70 is switched after the mechanical oil pump 42 is stopped.

4 Claims, 7 Drawing Sheets

(52) U.S. Cl.
CPC ............... *F16H 2200/2043* (2013.01); *F16H 2200/2082* (2013.01)

|  |  | C-1 | C-2 | C-3 | B-1 | B-2 | F-1 |
|---|---|---|---|---|---|---|---|
|  | P |  |  |  |  |  |  |
|  | REV |  |  | ○ |  | ○ |  |
|  | N |  |  |  |  |  |  |
| D | 1st | ○ |  |  |  | ● | ○ |
| D | 2nd | ○ |  |  | ○ |  |  |
| D | 3rd | ○ |  | ○ |  |  |  |
| D | 4th | ○ | ○ |  |  |  |  |
| D | 5th |  | ○ | ○ |  |  |  |
| D | 6th |  | ○ |  | ○ |  |  |

● : ENGAGED WHEN ENGINE BRAKE IS IN OPERATION

HYDRAULIC CONTROL DEVICE

TECHNICAL FIELD

Preferred embodiments relate to hydraulic control devices that are mounted on a vehicle including a motor and that control an oil pressure for hydraulic friction engagement elements in an automatic transmission that shifts power from the motor via the friction engagement elements to transmit the shifted power to axles.

BACKGROUND ART

As such hydraulic control devices, a device is conventionally proposed which is mounted on a vehicle including an engine and an automatic transmission, and which includes: a mechanical pump that is operated by power from an engine to generate an oil pressure; a linear solenoid valve that regulates the oil pressure from the mechanical pump to output the regulated oil pressure from an output port to an output port oil passage; an electromagnetic pump that generates an oil pressure by an electromagnetic force to output the generated oil pressure from a discharge port to a discharge port oil passage; a relay valve that has an input port (mechanical pump-side input port) connected to the output port oil passage, an output port connected to a clutch oil passage for supplying an oil pressure to a starting clutch, an input port (electromagnetic pump-side input port) connected to the discharge port oil passage, and a drain port connected to a drain oil passage, and that is operated by a signal pressure generated based on the oil pressure from the mechanical pump to allow corresponding ones of the ports to communicate with each other and shut off communication between corresponding ones of the ports; and a check valve that is attached to the drain oil passage and that is opened when an oil pressure equal to or higher than a set pressure is applied to the drain oil passage (see, e.g., Patent Document 1). When the signal pressure is equal to or higher than a predetermined pressure, the relay valve allows the mechanical pump-side input port to communicate with the output port, allows the electromagnetic pump-side input port to communicate with the drain port, and shuts off communication between the electromagnetic pump-side input port and the output port (first state). When the signal pressure is lower than the predetermined pressure, the relay valve allows the electromagnetic pump-side input port to communicate with the output port, shuts off communication between the mechanical pump-side input port and the output port, and shuts off communication between the electromagnetic pump-side input port and the drain port (second state). In the hydraulic control device configured as described above, if automatic stop conditions such as the vehicle being in a stopped state are satisfied and the engine is stopped, the mechanical pump is stopped, and the signal pressure becomes lower than the predetermined pressure, so that the relay valve switches from the first state to the second state. The engagement pressure of the starting clutch can therefore be held at a predetermined standby pressure by operating the electromagnetic pump. Accordingly, the next time the engine is started, the starting clutch can be quickly engaged, and the vehicle can be smoothly started.

[Patent Document 1] Japanese Patent Application Publication No. 2012-122560 (JP 2012-122560 A)

SUMMARY

In this type of hydraulic control device, if the discharge port oil passage contains air etc., the oil pressure may not sufficiently increase even if the electromagnetic pump is operated. As described above, when the relay valve is in the first state, the electromagnetic pump-side input port connected to the discharge port oil passage communicates with the drain port to which the drain oil passage is connected. Accordingly, the air in the discharge port oil passage can be discharged from the check valve via the drain oil passage by operating the electromagnetic pump before the relay valve is switched from the first state to the second state. In this case, oil in the discharge port oil passage and the drain oil passage can be made to flow faster and discharge of the air can be facilitated by making the set pressure of the check valve (spring load) as low as possible. However, the oil pressure in the discharge port oil passage does not become equal to or higher than the set pressure of the check valve. Accordingly, if the set pressure is too low, the engagement pressure of the clutch drops significantly when the relay valve switches from the first state to the second state, namely when the discharge port oil passage is allowed to communicate with the clutch oil passage. If a command to start the vehicle is sent in the state where the engagement pressure of the clutch has dropped, engagement of the starting clutch is delayed, which hinders smooth starting of the vehicle.

It is a primary object of a hydraulic control device according to some preferred embodiments to suppress a drop in engagement pressure of a friction engagement element while facilitating discharge of air etc. in an oil passage of an electric pump that supplies an oil pressure to the friction engagement element instead of a mechanical pump when the mechanical pump that supplies an oil pressure to the friction engagement element is stopped after a motor is stopped.

The hydraulic control device of a preferred embodiment takes the following measures in order to achieve the above primary object.

A first hydraulic control device according to a preferred embodiment is a hydraulic control device that is mounted on a vehicle including a motor and that controls an oil pressure for hydraulic friction engagement elements in an automatic transmission that shifts power from the motor via the friction engagement elements to transmit the shifted power to an axle side, the hydraulic control device including: a mechanical pump that is operated by the power from the motor to generate an oil pressure; an electric pump that is supplied with electric power and operated by the electric power to generate an oil pressure; a switch valve that is operated by a signal pressure generated based on the oil pressure from the mechanical pump, that attains, when the signal pressure is equal to or higher than a predetermined pressure, a first state where the switch valve opens a path from the mechanical pump to an oil chamber of the starting friction engagement element, opens a path from the electric pump to a drain oil passage, and closes a path from the electric pump to the oil chamber of the friction engagement element, and that attains, when the signal pressure is lower than the predetermined pressure, a second state where the switch valve opens the path from the electric pump to the oil chamber of the starting friction engagement element, closes the path from the mechanical pump to the oil chamber of the starting friction engagement element, and closes the path from the electric pump to the drain oil passage; a drain on-off valve that is opened to drain oil in the drain oil passage when an oil pressure in the drain oil passage is equal to or higher than a set pressure, and that is closed to prevent draining of the oil in the drain oil passage when the oil pressure in the drain oil passage is lower than the set pressure; and a control unit that controls the electric pump so that, when the motor is stopped, operation of the electric pump is started before the switch valve switches from the first state to the second state. In the first hydraulic control device, the set pressure of the drain on-off valve is determined as an oil pressure lower than a maximum oil pressure that is generated by the electric pump and equal to or higher than a standby pressure of the starting friction engagement element as a pressure during a period in which the motor is in the stopped state.

The first hydraulic control device of a preferred embodiment includes: the switch valve that is operated by the signal pressure generated based on the oil pressure from the mechanical pump, that attains, when the signal pressure is equal to or higher than the predetermined pressure, the first state where the switch valve opens the path from the mechanical pump to the oil chamber of the starting friction engagement element, opens the path from the electric pump to the drain oil passage, and closes the path from the electric pump to the oil chamber of the friction engagement element, and that attains, when the signal pressure is lower than the predetermined pressure, the second state where the switch valve opens the path from the electric pump to the oil chamber of the starting friction engagement element, closes the path from the mechanical pump to the oil chamber of the starting friction engagement element, and closes the path from the electric pump to the drain oil passage; and the drain on-off valve that is opened to drain oil in the drain oil passage when the oil pressure in the drain oil passage is equal to or higher than the set pressure, and that is closed to prevent draining of the oil in the drain oil passage when the oil pressure in the drain oil passage is lower than the set pressure. The first hydraulic control device controls the electric pump so that, when the motor is stopped, operation of the electric pump is started before the switch valve switches from the first state to the second state. In the first hydraulic control device, the set pressure of the drain on-off valve is determined as an oil pressure lower than the maximum oil pressure that is generated by the electric pump and equal to or higher than the standby pressure of the starting friction engagement element as a pressure during the period in which the motor is in the stopped state. If the motor is stopped and the mechanical pump is stopped, the electric pump is operated before the switch valve switches from the first state to the second state. The drain on-off valve whose set pressure is lower than the maximum oil pressure that is generated by the electric pump is thus opened, whereby discharge of air etc. contained in an oil passage in the electric pump can be facilitated. In this case, the oil pressure in the oil passage in the electric pump is kept close to the set pressure of the drain on-off valve, and is equal to or higher than the standby pressure of the starting friction engagement element as a pressure during the period in which the motor is in the stopped state. This can suppress a drop in engagement pressure of the friction engagement element when the switch valve switches to the second state, namely when the path from the electric pump to the oil chamber of the starting friction engagement element is opened. The "electric pump" may be an electromagnetic pump that generates an oil pressure by reciprocating a piston by application and non-application of an electromagnetic force. The "standby pressure" includes, e.g., a pressure close to a stroke end pressure, a pressure close to a stroke start pressure, and a pressure between the stroke start pressure and the stroke end pressure.

In this first hydraulic control device of invention preferred embodiment, the set pressure of the drain on-off valve may be determined as an oil pressure higher than an oil pressure of the starting friction engagement element in the first state at the time the switch valve switches from the first state to the second state. As used herein, the "oil pressure of the starting friction engagement element in the first state" is an oil pressure that is applied to the starting friction engagement element when the motor is stopped in the first state, that is, in the state where the path from the mechanical pump to the oil chamber of the starting friction engagement element is opened, and this oil pressure changes (decreases) with time that has passed since the motor was stopped.

In the first hydraulic control device of a preferred embodiment, the predetermined pressure of the switch valve may be determined so that the switch valve switches from the first state to the second state while an oil pressure higher than a piston stroke end pressure remains in the oil chamber of the starting friction engagement element. The engagement pressure of the friction engagement element can thus be kept relatively high before and after the switch valve switches from the first state to the second state after the mechanical pump is stopped.

A second hydraulic control device according to a preferred embodiment is a hydraulic control device that is mounted on a vehicle including a motor and that controls an oil pressure for hydraulic friction engagement elements in an automatic transmission that shifts power from the motor via the friction engagement elements to transmit the shifted power to an axle side, the hydraulic control device including: a mechanical pump that is operated by the power from the motor to generate an oil pressure; an electric pump that is supplied with electric power and operated by the electric power to generate an oil pressure; a switch valve that is operated by a signal pressure generated based on the oil pressure from the mechanical pump, that attains, when the signal pressure is equal to or higher than a predetermined pressure, a first state where the switch valve opens a path from the mechanical pump to an oil chamber of the starting friction engagement element, opens a path from the electric pump to a drain oil passage, and closes a path from the electric pump to the oil chamber of the friction engagement element, and that attains, when the signal pressure is lower than the predetermined pressure, a second state where the switch valve opens the path from the electric pump to the oil chamber of the starting friction engagement element, closes the path from the mechanical pump to the oil chamber of the starting friction engagement element, and closes the path from the electric pump to the drain oil passage; a drain on-off valve that is operated by a control signal and that drains oil in the drain oil passage when opened and prevents draining of the oil in the drain oil passage when closed; and a control unit that controls the electric pump and the drain on-off valve. In the second hydraulic control device, when the motor is stopped, the control unit controls the electric pump so that operation of the electric pump is started before the switch valve switches from the first state to the second state, and controls the drain on-off valve so that the drain on-off valve is opened at least when the electric pump is in operation, and is closed before the switch valve switches from the first state to the second state.

The second hydraulic control device of a preferred embodiment includes: the switch valve that is operated by the signal pressure generated based on the oil pressure from the mechanical pump, that attains, when the signal pressure is equal to or higher than the predetermined pressure, the first state where the switch valve opens the path from the mechanical pump to the oil chamber of the starting friction engagement element, opens the path from the electric pump to the drain oil passage, and closes the path from the electric pump to the oil chamber of the friction engagement element, and that attains, when the signal pressure is lower than the predetermined pressure, the second state where the switch valve opens the path from the electric pump to the oil chamber of the starting friction engagement element, closes the path from the mechanical pump to the oil chamber of the starting friction engagement element, and closes the path from the electric pump to the drain oil passage; and the drain on-off valve that is operated by the control signal and that drains oil in the drain oil passage when opened and prevents draining of the oil in the drain oil passage when closed. When the motor is stopped, the second hydraulic control device controls the electric pump so that operation of the electric pump is started before the switch valve switches from the first state to the second state, and controls the drain on-off valve so that the drain on-off valve is opened at least when the electric pump is in operation, and is closed before the switch valve switches from the first state to the second state. When the motor is stopped and the mechanical pump is stopped, the electric pump is operated by opening the drain on-off valve before the switch valve switches from the first state to the second state. This can facilitate discharge of air etc. contained in an oil passage of the electric pump. The oil pressure in the oil passage of the electric pump can be increased by closing the drain on-off valve before the switch valve switches from the first state to the second state after the air etc. is discharged. This can suppress a drop in engagement pressure of the friction engagement element when the switch valve switches to the second state, namely when the path from the electric pump to the oil chamber of the starting friction engagement element is opened. The "electric pump" may be an electromagnetic pump that generates an oil pressure by reciprocating a piston by application and non-application of an electromagnetic force.

BEST MODES

A mode for carrying out a preferred embodiment will be described below.

Figure 1:
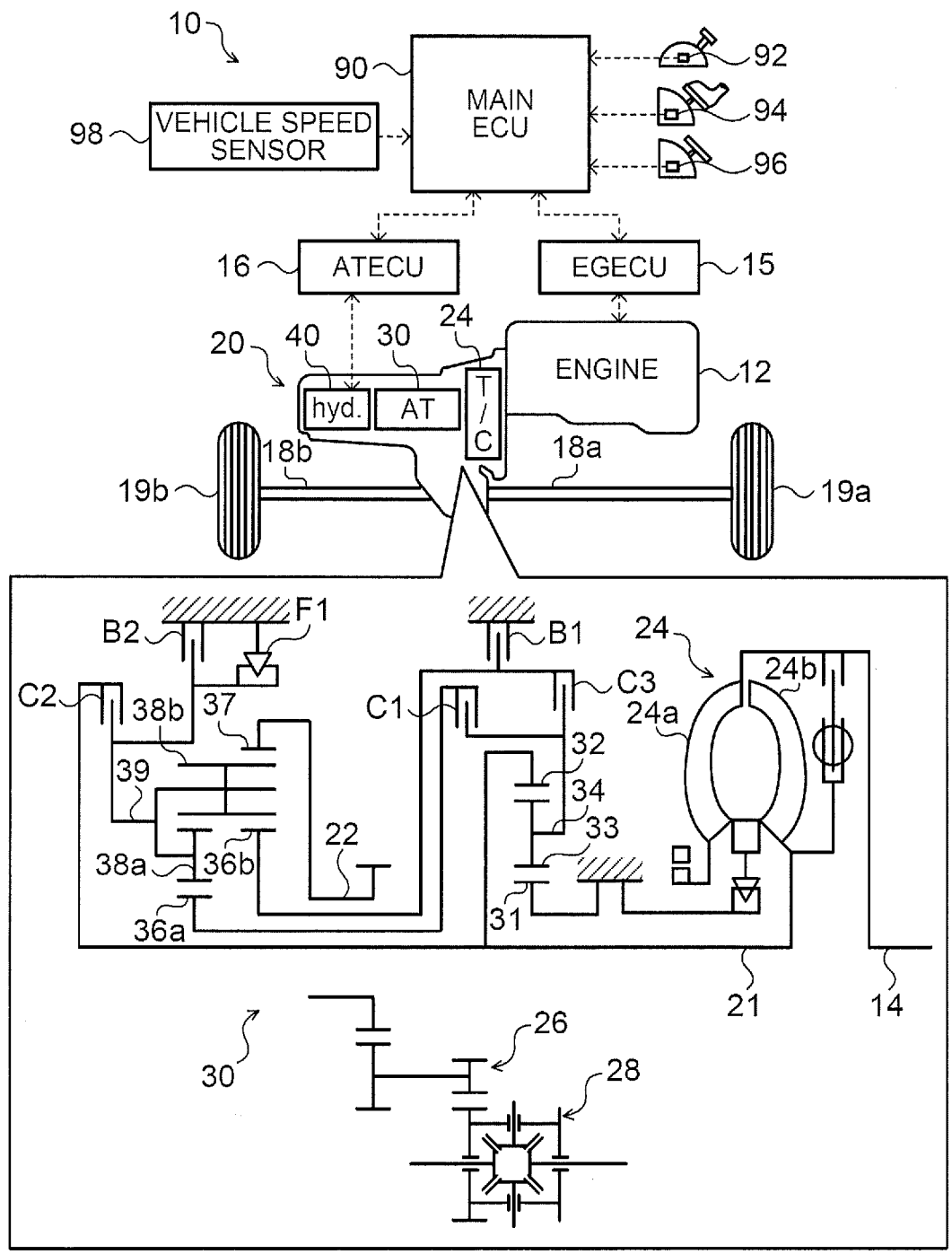
FIG. 1 is a configuration diagram schematically showing the configuration of an automobile 10 on which an engine 12 and a power transmission device 20 are mounted.
Figures 2, 3:
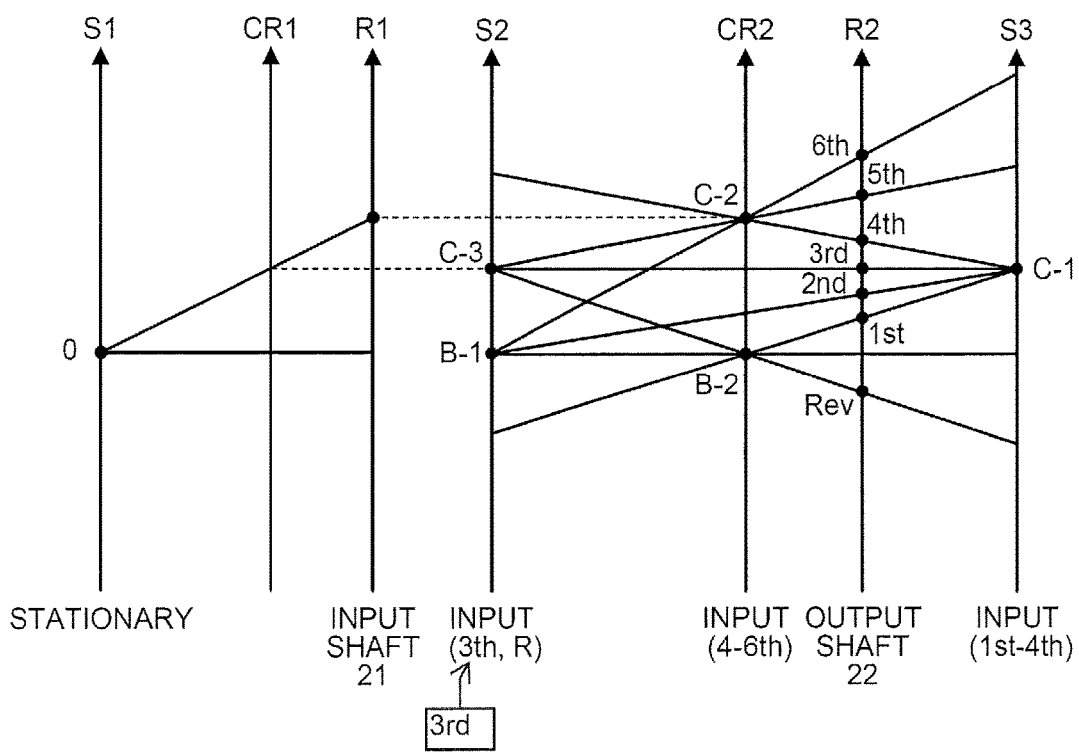
FIG. 2 is an illustration showing an operation table of an automatic transmission 30.
FIG. 3 is a collinear diagram showing the relation of the rotational speed among rotary elements of the automatic transmission 30.

FIG. 1 is a configuration diagram schematically showing the configuration of an automobile 10 on which an engine 12 and a power transmission device 20 are mounted. FIG. 2 is an illustration showing an operation table of an automatic transmission 30.

As shown in FIG. 1, the automobile 10 includes: the engine 12 as an internal combustion engine that outputs power by explosive combustion of hydrocarbon fuel such as gasoline or light oil; an engine electronic control unit (engine ECU) 15 that controls operation of the engine 12; the power transmission device 20 that is connected to a crankshaft 14 of the engine 12 and connected to axles 18a, 18b of right and left wheels 19a, 19b to transmit the power from the engine 12 to the axles 18a, 18b; an automatic transmission electronic control unit (ATECU) 16 that controls the power transmission device 20; and a main electronic control unit (main ECU) 90 that controls the entire vehicle. The main ECU 90 receives via input ports a shift position SP from a shift position sensor 92, an accelerator operation amount Acc from an accelerator pedal position sensor 94, a brake switch signal BSW from a break switch 96, a vehicle speed V from a vehicle speed sensor 98, etc. The main ECU 90 is connected to the engine ECU 15 and the ATECU 16 via communication ports to output and receive various control signals and data to and from the engine ECU 15 and the ATECU 16.

As shown in FIG. 1, the power transmission device 20 includes: a torque converter 24 with a lockup clutch which is formed by an input-side pump impeller 24a connected to the crankshaft 14 of the engine 12 and an output-side turbine runner 24b; the stepped automatic transmission 30 that has an input shaft 21 connected to the turbine runner 24b of the torque converter 24 and an output shaft 22 connected to the axles 18a, 18b via a gear mechanism 26 and a differential gear 28, and that shifts power received by the input shaft 21 to output the shifted power to the output shaft 22; and a hydraulic circuit 40 serving as the hydraulic control device of a preferred embodiment which controls an oil pressure required for operation of the torque converter 24 and the automatic transmission 30. In the embodiment, the torque converter 24 is interposed between the crankshaft 14 of the engine 12 and the automatic transmission 30. However, the preferred embodiment is not limited to this, and various starting devices can be used.

The automatic transmission 30 is configured as a 6-speed stepped automatic transmission, and includes a single-pinion type planetary gear mechanism, a Ravigneaux type planetary gear mechanism, three clutches C1, C2, C3, two brakes B1, B2, and a one-way clutch F1. The single-pinion type planetary gear mechanism includes a sun gear 31 serving as an external gear, a ring gear 32 serving as an internal gear which is disposed concentrically with the sun gear 31, a plurality of pinion gears 33 that mesh with the sun gear 31 and mesh with the ring gear 32, and a carrier 34 that holds the plurality of pinion gears 33 so that the pinion gears 33 can rotate and revolve. The sun gear 31 is fixed to a case, and the ring gear 32 is connected to the input shaft 21. The Ravigneaux type planetary gear mechanism includes: two sun gears 36a, 36b serving as external gears; a ring gear 37 serving as an internal gear; a plurality of short pinion gears 38a that mesh with the sun gear 36a; a plurality of long pinion gears 38b that mesh with the sun gear 36b and the plurality of short pinion gears 38a and mesh with the ring gear 37; and a carrier 39 that couples the plurality of short pinion gears 38a and the plurality of long pinion gears 38b and holds the plurality of short pinion gears 38a and the plurality of long pinion gears 38b so that the plurality of short pinion gears 38a and the plurality of long pinion gears 38b can rotate and revolve. The sun gear 36a is connected to the carrier 34 of the single-pinion type planetary gear mechanism via the clutch C1. The sun gear 36b is connected to the carrier 34 via the clutch C3 and is connected to the case via the brake B1. The ring gear 37 is connected to the output shaft 22, and the carrier 39 is connected to the input shaft 21 via the clutch C2. The carrier 39 is connected to the case via the one-way clutch F1, and is connected to the case via the brake B2 provided in parallel with the one-way clutch F1.

As shown in FIG. 2, the automatic transmission 30 can switch among first to sixth forward speeds, a reverse speed, and a neutral state by combination of on and off (engagement and disengagement) of the clutches C1 to C3 and on and off of the brakes B1, B2. The reverse speed can be attained by turning on the clutch C3 and the brake B2 and turning off the clutches C1, C2 and the brake B1. The first forward speed can be attained by turning on the clutch C1 and turning off the clutches C2, C3 and the brakes B1, B2. At the first forward speed, the brake B2 is turned on when engine brake is in operation. The second forward speed can be attained by turning on the clutch C1 and the brake B1 and turning off the clutches C2, C3 and the brake B2. The third forward speed can be attained by turning on the clutches C1, C3 and turning off the clutch C2 and the brakes B1, B2. The fourth forward speed can be attained by turning on the clutches C1, C2 and turning off the clutch C3 and the brakes B1, B2. The fifth forward speed can be attained by turning on the clutches C2, C3 and turning off the clutch C1 and the brakes B1, B2. The sixth forward speed can be attained by turning on the clutch C2 and the brake B1 and turning off the clutches C1, C3 and the brake B2. The neutral state can be attained by turning off all of the clutches C1 to C3 and the brakes B1, B2. FIG. 3 is a collinear diagram showing the relation of the rotational speed among the rotary elements at each shift speed of the automatic transmission 30. In the figure, S1-axis represents the rotational speed of the sun gear 31, CR1-axis represents the rotational speed of the carrier 34, R1-axis represents the rotational speed of the ring gear 32, S2-axis represents the rotational speed of the sun gear 36b, S3-axis represents the rotational speed of the sun gear 36a, CR2-axis represents the rotational speed of the carrier 39, and R2-axis represents the rotational speed of the ring gear 37.

Figure 4:
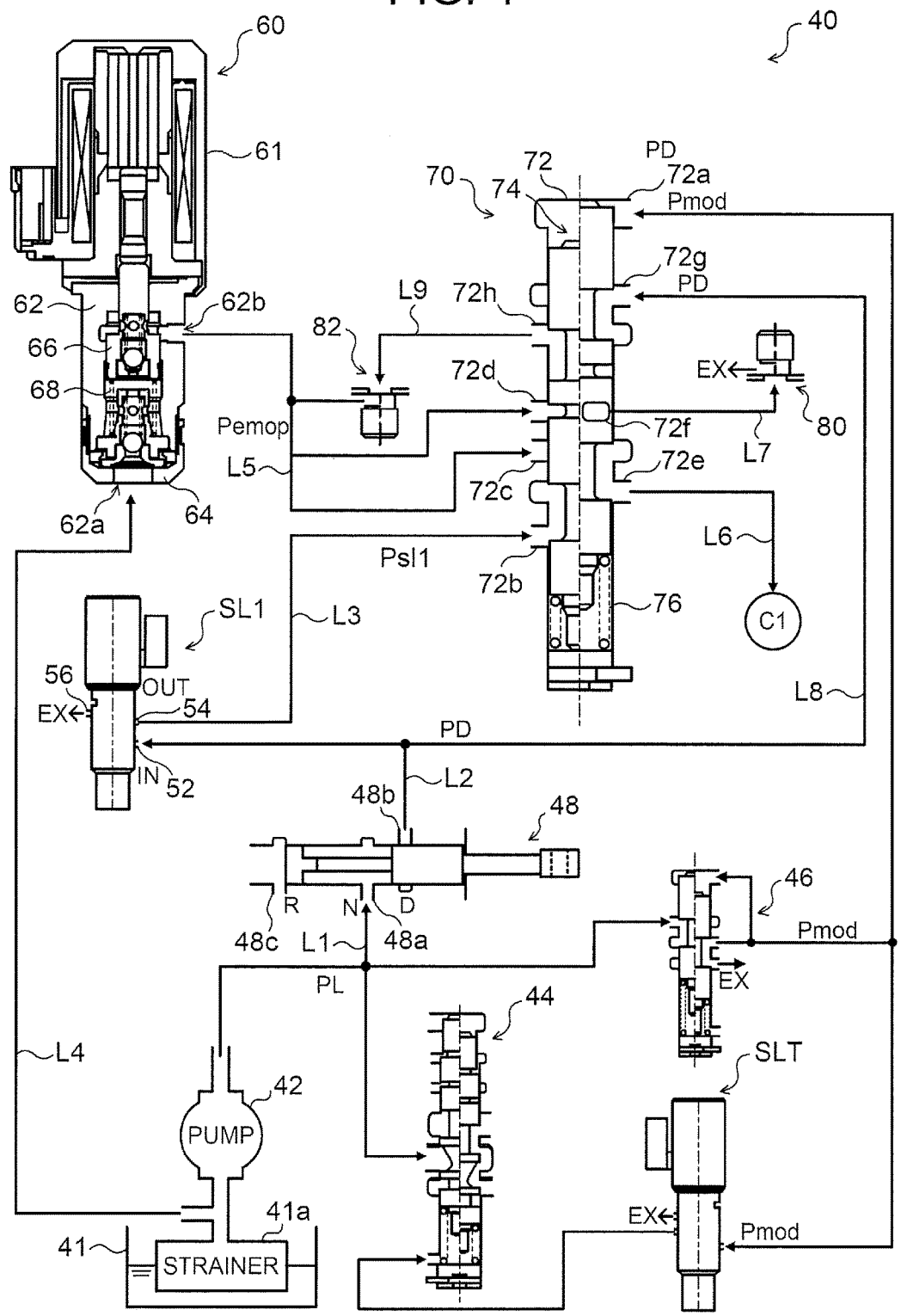
FIG. 4 is a configuration diagram schematically showing the configuration of a hydraulic circuit 40 that controls the power transmission device 20.

The clutches C1 to C3 and the brakes B1, B2 in the automatic transmission 30 are turned on and off (engaged and disengaged) by the hydraulic circuit 40 shown by way of example in FIG. 4. As shown in FIG. 4, the hydraulic circuit 40 is formed by components such as: a mechanical oil pump 42 that is operated by the power from the engine 12 to suck hydraulic oil stored in an oil pan 41 via a strainer 41a and pump the sucked hydraulic oil to a line pressure oil passage L1; a regulator valve 44 that regulates the pressure of the hydraulic oil pumped from the mechanical oil pump 42 to generate a line pressure PL; a modulator valve 46 that reduces the line pressure PL to a fixed pressure to generate a modulator pressure Pmod; a linear solenoid valve SLT that regulates the modulator pressure Pmod and outputs the regulated pressure as a signal pressure to drive the regulator valve 44; a manual valve 48 that has an input port 48a connected to the line pressure oil passage L1, a drive (D) position output port 48b connected to a drive pressure oil passage L2, a reverse (R) position output port 48c, etc. and that allows corresponding ones of the ports to communicate with each other or shuts off communication between corresponding ones of the ports according to the shift position; a normally closed linear solenoid valve SL1 that has an input port 52 connected to the drive pressure oil passage L2, an output port 54 connected to an output port oil passage L3, and a drain port 56, and that receives hydraulic oil in the drive pressure oil passage L2 via the input port 52 and drains a part of the hydraulic oil from the drain port 56 to regulate the pressure of the received hydraulic oil, and outputs the regulated pressure from the output port 54; an electromagnetic pump 60 that has a suction port 62a connected to the strainer 41a via a suction port oil passage L4 and a discharge port 62b connected to a discharge port oil passage L5, and that reciprocates a piston 66 by an electromagnetic force to suck hydraulic oil from the suction port 62a and discharge the sucked hydraulic oil from the discharge port 62b; a C1 relay valve 70 that selectively switches between a mode in which an SL1 pressure Psl1 as an output pressure from the linear solenoid valve SL1 is supplied to a C1 oil passage L6 connected to a hydraulic servo (oil chamber) of the clutch C1 and a mode in which a discharged pressure from the electromagnetic pump 60 is supplied to the C1 oil passage L6; and a damper, not shown, which is connected to the C1 oil passage L6 and suppresses fluctuation of the oil pressure that is applied to the hydraulic servo of the clutch C1. Although FIG. 4 shows only an oil pressure supply system for the clutch C1, oil pressure supply systems for the clutches C2, C3 and the brakes B1, B2 can be similarly configured by well-known solenoid valves and relay valves. The linear solenoid valves SLT, SL1, the electromagnetic pump 60, etc. are operated by drive control by the ATECU 16.

When a shift lever is shifted to a drive (D) position, the manual valve 48 allows the input port 48a and the D position output port 48b to communicate with each other, and shuts off communication between the input port 48a and the R position output port 48c. When the shift lever is shifted to a reverse (R) position, the manual valve 48 shuts off communication between the input port 48a and the D position output port 48b and allows the input port 48a and the R position output port 48c to communicate with each other. When the shift lever is shifted to a neutral (N) position, the manual valve 48 shuts off communication between the input port 48a and the D position output port 48b and between the input port 48a and the R position output port 48c.

The drive pressure oil passage L2 is connected to the discharge port oil passage L5 via a bypass oil passage. The bypass oil passage is formed by an upstream side L8 connected to the drive pressure oil passage L2 and a downstream side L9 connected to the discharge port oil passage L5, and the C1 relay valve 70 is interposed between the upstream side L8 and the downstream side L9. A check valve 82 is attached to the downstream side L9 of the bypass oil passage. The check valve 82 allows oil to flow out from the downstream side L9 of the bypass oil passage to the discharge port oil passage L5, but does not allow oil to flow from the discharge port oil passage L5 into the downstream side L9 of the bypass oil passage.

The C1 relay valve 70 is configured as a spool relay valve including a sleeve 72 having various ports, a spool 74 that slides in the axial direction in the sleeve 72 to allow corresponding ones of the ports to communicate with each other and shut off communication between corresponding ones of the ports, and a spring 76 that presses a spool end face in the axial direction. The sleeve 72 has as various ports: a signal pressure port 72a that receives the modulator pressure Pmod as a signal pressure that presses a spool end face in the opposite direction from that of the biasing force of the spring 76; an input port 72b that is connected to the output port oil passage L3 and receives the SL1 pressure Psl1; an input port 72c that is connected to the discharge port oil passage L5 and receives a discharge pressure from the electromagnetic pump 60; an input port 72d that is connected to the discharge port oil passage L5 and receives the discharge pressure from the electromagnetic pump 60; an output port 72e that is connected to the C1 oil passage L6; a drain port 72f that is connected to a drain oil passage L7 having a check valve 80 attached thereto; a connection port 72g that is connected to the upstream side L8 of the bypass oil passage branching from the drive pressure oil passage L2; and a connection port 72h that is connected to the downstream side L9 of the bypass oil passage.

In the C1 relay valve 70 having the above configuration, when a signal pressure (modulator pressure Pmod) that is equal to or higher than a pressure (set pressure) that overcomes the biasing force of the spring 76 is applied to the signal pressure port 72a, the spool 74 is moved by the modulator pressure Pmod in such a direction that the spring 76 is compressed (the spool 74 is moved to the position shown in the left half in FIG. 4). In this state, the spool 74 allows the input port 72b to communicate with the output port 72e and shuts off communication between the input port 72c and the output port 72e. Moreover, the spool 74 allows the input port 72d to communicate with the drain port 72f and shuts off communication between the connection ports 72g, 72h. Accordingly, the output port 54 of the linear solenoid valve SL1 communicates with the hydraulic servo (oil chamber) of the clutch C1 sequentially via the output port oil passage L3, the input port 72b, the output port 72e, and the C1 oil passage L6, and communication between the discharge port 62b of the electromagnetic pump 60 and the hydraulic servo of the clutch C1 is shut off. Moreover, the discharge port 62b of the electromagnetic pump 60 communicates with the check valve 80 via the discharge port oil passage L5, the input port 72d, the drain port 72f, and the drain oil passage L7, and communication between the upstream side L8 of the bypass oil passage and the downstream side L9 of the bypass oil passage is shut off. When the signal pressure (modulator pressure Pmod) that is equal to or higher than the pressure (set pressure) that overcomes the biasing force of the spring 76 is not applied to the signal pressure port 72a, the spool 74 is moved by the biasing force of the spring 76 in such a direction that the spring 76 is extended (the spool 74 is moved to the position shown in the right half in FIG. 4). In this state, the spool 74 shuts off communication between the input port 72b and the output port 72e, and allows the input port 72c to communicate with the output port 72e. Moreover, the spool 74 shuts off communication between the input port 72d and the drain port 72f, and allows the connection ports 72g, 72h to communicate with each other. Accordingly, communication between the output port 54 of the linear solenoid valve SL1 and the hydraulic servo (oil chamber) of the clutch C1 is shut off, and the discharge port 62b of the electromagnetic pump 60 communicates with the hydraulic servo of the clutch C1 sequentially via the discharge port oil passage L5, the input port 72c, the output port 72e, and the C1 oil passage L6. Moreover, communication between the discharge port 62b of the electromagnetic pump 60 and the drain oil passage L7 is shut off, and the drive pressure oil passage L2 communicates with the discharge port oil passage L5 via the upstream side L8 of the bypass oil passage, the connection port 72g, the connection port 72h, the downstream side L9 of the bypass oil passage, and the check valve 82.

The C1 relay valve 70 operates by using as a signal pressure the modulator pressure Pmod generated based on the line pressure PL. Accordingly, when the engine 12 is in operation, namely when the mechanical oil pump 42 is in operation, the input port 72b (output port oil passage L3) communicates with the output port 72e (C1 oil passage L6), and the SL1 pressure Psl1 obtained by regulating the line pressure PL is applied to the hydraulic servo (oil chamber) of the clutch C1. When the engine 12 is stopped, namely when the mechanical oil pump 42 is stopped, the line pressure PL (modulator pressure Pmod) gradually decreases, and therefore the SL1 pressure Psl1 that has been applied to the hydraulic servo of the clutch C1 also decreases gradually. When the modulator pressure Pmod decreases to a value smaller than the set pressure of the C1 relay valve 70, the C1 relay valve 70 switches from the state where the input port 72b (output port oil passage L3) communicates with the output port 72e (C1 oil passage L6) to the state where the input port 72c (discharge port oil passage L5) communicates with the output port 72e (C1 oil passage L6), so that the electromagnetic pump 60 instead of the mechanical oil pump 42 applies an oil pressure to the hydraulic servo of the clutch C1. In the present embodiment, the set pressure of the C1 relay valve 70 (spring load of the spring 76) is adjusted so that the state of the C1 relay valve 70 is switched while the SL1 pressure Psl1 (residual pressure Pre) remaining in the hydraulic servo (oil chamber) of the clutch C1 is higher than a piston stroke end pressure Pse of the clutch C1. The "piston stroke end" means that the piston finishes its stroke to the position where the piston can actually start pressing the friction engagement element (namely, elimination of backlash between the piston and the friction engagement element is finished).

As shown in the figure, the electromagnetic pump 60 is configured as a piston pump, which includes: a solenoid 61 that generates an electromagnetic force; a cylinder 62 having a hollow cylindrical shape; the piston 66 that is inserted in the cylinder 62 and is capable of sliding when pressed by the electromagnetic force from the solenoid 61; an end plate 64 attached to an end of the cylinder 62; and a spring 68 that is interposed between the end plate 64 and the piston 66 to apply a biasing force to the piston 66 in the opposite direction to that of the electromagnetic force of the solenoid 61, and which generates an oil pressure by intermittently driving the solenoid 61 to reciprocate the piston 66. The end plate 64 contains a suction check valve that allows hydraulic oil to flow from the suction port 62a, but does not allow hydraulic oil to flow in the opposite direction. The piston 66 contains a discharge check valve that allows hydraulic oil to flow out into the discharge port 62b, but does not allow hydraulic oil to flow in the opposite direction. Discharge capability (electromagnetic force of the solenoid 61, pump capacity, etc.) of the electromagnetic pump 60 of the present embodiment is determined so that the hydraulic servo of the clutch C1 is held at a predetermined standby pressure higher than the piston stroke end pressure Pse.

Although not shown in detail in the figure, the check valve 80 is formed by a valve housing having formed therein a discharge port of the drain oil passage L7, a valve body accommodated in the valve housing, and a valve spring that applies to the valve body a biasing force that presses a pressure-receiving surface of the valve body against the discharge port. In this check valve 80, when an oil pressure equal to or higher than a pressure (set pressure) that overcomes the biasing force of the valve spring is applied to the drain oil passage L7, the discharge port is opened to drain hydraulic oil in the drain oil passage L7. When the oil pressure equal to or higher than the pressure (set pressure) that overcomes the biasing force of the valve spring is not applied to the drain oil passage L7, the discharge port is closed so as not to allow the hydraulic oil in the drain oil passage L7 to be drained. Accordingly, air in the electromagnetic pump 60 and air in the discharge port oil passage L5 can be discharged from the discharge port via the drain oil passage L7 and the check valve 80 by operating the electromagnetic pump 60 with the C1 relay valve 70 allowing the discharge port oil passage L5 to communicate with the drain oil passage L7. The check valve 80 holds the oil pressure in the drain oil passage L7 and in the discharge port oil passage L5 communicating with the drain oil passage L7 at an oil pressure close to the set pressure by discharging an oil pressure equal to or higher than the set pressure. Due to the backflow preventing function of the check valve 80, air is prevented from flowing into the discharge port oil passage L5 from the discharge port. Moreover, when the C1 relay valve 70 shuts off communication between the discharge port oil passage L5 and the drain oil passage L7, the discharge port oil passage L5 does not communicate with the discharge port, and hydraulic oil discharged from the electromagnetic pump 60 therefore does not flow out from the discharge port. In the present embodiment, the set pressure of the check valve 80 (spring load of the valve spring) is adjusted to an oil pressure that is lower than the maximum oil pressure obtained by the discharge capability of the electromagnetic pump 60 and higher than the SL1 pressure Psl1 (residual pressure Pre) remaining in the hydraulic servo of the clutch C1 when the state of the C1 relay valve 70 is switched after the engine 12 is stopped (e.g., an oil pressure slightly lower than the maximum oil pressure obtained by the discharge capability of the electromagnetic pump 60). The reason for this will be described later.

Operation of the automobile 10 of the embodiment configured as described above will be described. In the embodiment, the engine 12 is automatically stopped if all of preset automatic stop conditions, such as a vehicle speed V being 0, accelerator off, and a brake switch signal BSW being on, are satisfied while the automobile 10 is traveling with the shift lever being at D position. If the engine 12 is automatically stopped, the automatically stopped engine 12 is automatically started if preset automatic start conditions such as the brake switch signal BSW being off are satisfied thereafter. Automatic start control and automatic stop control for the engine 12 are performed by the main ECU 90 by determining if the automatic start conditions or the automatic stop conditions are satisfied or not in response to various detection signals, and sending a control command according to the determination result to the engine ECU 15 and the ATECU 16.

If the automatic stop conditions are satisfied and the engine 12 is automatically stopped, the line pressure PL (modulator pressure Pmod) gradually decreases with a decrease in rotational speed of the engine 12. When the modulator pressure Pmod becomes lower than the set pressure of the C1 relay valve 70, the C1 relay valve 70 switches from the state where the output port 54 of the linear solenoid valve SL1 communicates with the hydraulic servo of the clutch C1 to the state where the discharge port 62b of the electromagnetic pump 60 communicates with the hydraulic servo of the clutch C1. Accordingly, the engagement pressure of the clutch C1 can be held at a predetermined pressure or more by operating the electromagnetic pump 60. When the C1 relay valve 70 is in the state where the output port 54 of the linear solenoid valve SL1 communicates with the hydraulic servo of the clutch C1, the discharge port 62b of the electromagnetic pump 60 communicates with the drain oil passage L7. Accordingly, air in the electromagnetic pump 60 and in the discharge port oil passage L5 can be discharged from the check valve 80 via the drain oil passage L7 by starting operation of the electromagnetic pump 60 before the state of the C1 relay valve 70 is switched (before the modulator pressure Pmod becomes lower than the set pressure). If the automatic start conditions for the engine 12 are satisfied, cranking of the engine 12 is started by a starter motor, not shown, and the line pressure PL (modulator pressure Pmod) increases with an increase in rotational speed of the engine 12. At this time, the C1 relay valve 70 allows the discharge port 62b of the electromagnetic pump 60 to communicate with the hydraulic servo of the clutch C1 and shuts off communication between the output port 54 of the linear solenoid valve SL1 and the clutch C1 until the modulator pressure Pmod becomes equal to or higher than the set pressure. Accordingly, the SL1 pressure Psl1 from the linear solenoid valve SL1 cannot be supplied to the hydraulic servo of the clutch C1 during this period. However, when the C1 relay valve 70 is in this state, the drive pressure oil passage L2 communicates with the discharge port oil passage L5 via the upstream side L8 of the bypass oil passage, the connection port 72g, the connection port 72h, the downstream side L9 of the bypass oil passage, and the check valve 82. Accordingly, the line pressure PL (drive pressure PD) is introduced into the discharge port oil passage L5, and is supplied from the discharge port oil passage L5 to the hydraulic servo of the clutch C1 via the input port 72c, the output port 72e, and the C1 oil passage L6. When the modulator pressure Pmod becomes equal to or higher than the set pressure, the C1 relay valve 70 allows the output port 54 of the linear solenoid valve SL1 to communicate with the clutch C1. Accordingly, the SL1 pressure Psl1 from the linear solenoid valve SL1 is applied to the hydraulic servo of the clutch C1, and the clutch C1 is fully engaged. As described above, while the engine 12 is in the automatically stopped state, an oil pressure is supplied from the electromagnetic pump 60 to the hydraulic servo of the clutch C1 to cause the clutch C1 to stand by at the predetermined engagement pressure. The clutch C1 can thus be quickly engaged immediately after the engine 12 is automatically started. The automobile 10 can therefore be smoothly started.

Figure 5:
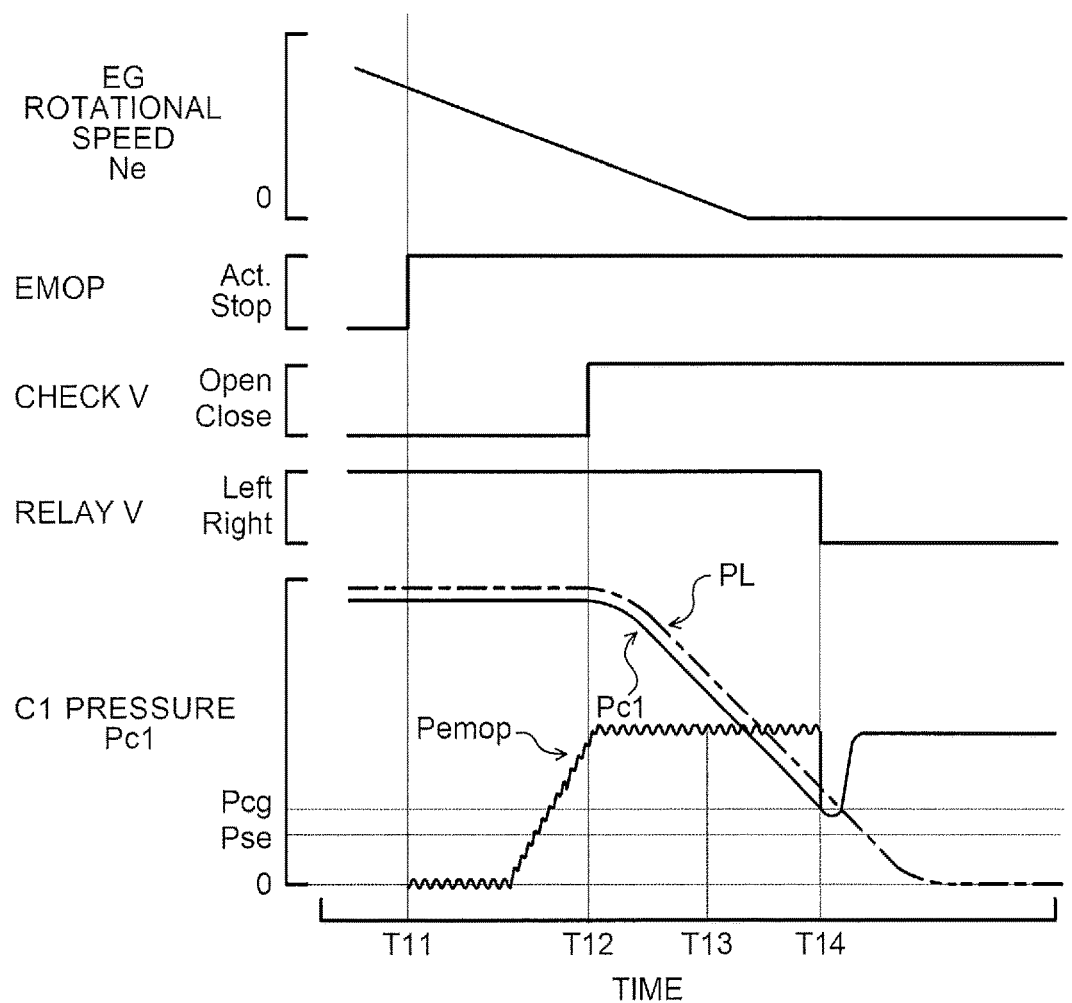
FIG. 5 is an illustration showing how an engine rotational speed Ne, the operating state of an electromagnetic pump 60, the operating state of a check valve 80, the operating state of a C1 relay valve 70, a line pressure PL, an electromagnetic pump pressure Pemop, and a C1 pressure Pc1 change with time when the engine is stopped in an embodiment.

FIG. 5 is an illustration showing how an engine rotational speed Ne, the operating state of the electromagnetic pump 60, the operating state of the check valve 80, the operating state of the C1 relay valve 70, the line pressure PL, an electromagnetic pump pressure Pemop, and a C1 pressure Pc1 change with time when the engine is stopped in the embodiment. In the embodiment, operation of the electromagnetic pump 60 is started to supply the discharge pressure to the discharge port oil passage L5 at time T11 immediately after the automatic stop conditions for the engine 12 are satisfied. At this time, the C1 relay valve 70 is in the state where the discharge port oil passage L5 communicates with the drain oil passage L7, and the check valve 80 is in a closed state. Accordingly, by operating the electromagnetic pump 60, the electromagnetic pump pressure Pemop, which is the oil pressure in the discharge port oil passage L5, gradually increases until it reaches the set pressure of the check valve

80. At time T12, the electromagnetic pump pressure Pemop reaches the set pressure of the check valve 80, and the check valve 80 is opened. Air in the electromagnetic pump 60 and in the discharge port oil passage L5 is thus discharged together with hydraulic oil therein via the drain oil passage L7 and the check valve 80. As described above, in the present embodiment, the set pressure of the check valve 80 is set to an oil pressure that is lower than the maximum oil pressure obtained by the discharge capability of the electromagnetic pump 60 and higher than the SL1 pressure Psl1 (residual pressure Pre) remaining in the hydraulic servo of the clutch C1 when the state of the C1 relay valve 70 is switched. It therefore takes some time before the check valve 80 is opened and the air is discharged after operation of the electromagnetic pump 60 is started. In the present embodiment, the timing (time T11) when operation of the electromagnetic pump is started can be determined so that the timing (time T13) when discharge of air in the discharge port oil passage L5 is completed after the check valve 80 is opened is earlier than the timing (time T14) when the state of the C1 relay valve is switched, by back-calculating, from the time at which discharge of the air in the discharge port oil passage L5 is completed, the time it takes for the oil pressure in the discharge port oil passage L5 to reach the set pressure of the check valve 80 after operation of the electromagnetic pump 60 is started and the time it takes for discharge of the air in the discharge port oil passage L5 to be completed after the check valve 80 is opened. Accordingly, if the modulator pressure Pmod is lower than the set pressure of the C1 relay valve 70 and the C1 relay valve 70 is switched to the state where the discharge port oil passage L5 communicates with the C1 oil passage L6 at time T14, an oil pressure higher than the SL1 pressure Psl1 (residual pressure Pre) remaining in the hydraulic servo of the clutch C1 immediately before the state of the C1 relay valve 70 is switched is introduced from the discharge port oil passage L5 to the hydraulic servo (oil chamber) of the clutch C1. This can suppress a drop in oil pressure in the hydraulic servo (oil chamber) of the clutch C1. In FIG. 5, "Pcg" represents the oil pressure Pc1 remaining in the hydraulic servo of the clutch C1 (friction engagement element) at time T14 when the state of the C1 relay valve 70 is switched.

Figure 6:
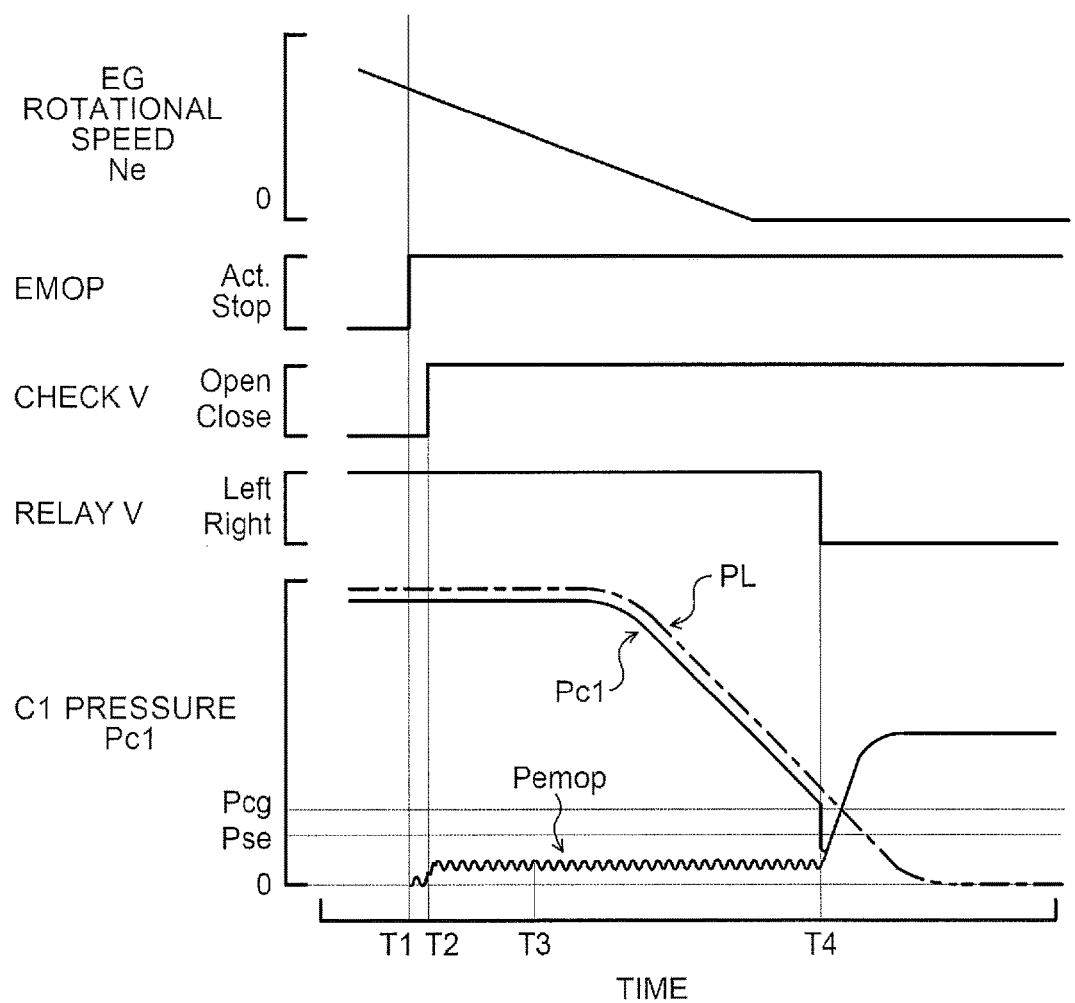
FIG. 6 is an illustration showing how the engine rotational speed Ne, the operating state of the electromagnetic pump 60, the operating state of the check valve 80, the operating state of the C1 relay valve 70, the line pressure PL, the electromagnetic pump pressure Pemop, and the C1 pressure Pc1 change with time when the engine is stopped in a comparative example.

FIG. 6 is an illustration showing how the engine rotational speed Ne, the operating state of the electromagnetic pump 60, the operating state of the check valve 80, the operating state of the C1 relay valve 70, the line pressure PL, the electromagnetic pump pressure Pemop, and the C1 pressure Pc1 change with time when the engine is stopped in a comparative example. The comparative example is different from the embodiment in that the set pressure of the check valve 80 is lower than the piston stroke end pressure Pse of the clutch C1. In the comparative example, the set pressure of the check valve 80 is relatively low. Accordingly, when operation of the electromagnetic pump 60 is started (time T1), the check valve 80 is promptly opened (time T2), and air in the discharge port oil passage L5 is discharged (time T3), but the discharge port oil passage L5 is held at a relatively low oil pressure. Accordingly, if the modulator pressure Pmod is lower than the set pressure of the C1 relay valve 70 and the C1 relay valve 70 is switched to the state where the discharge port oil passage L5 communicates with the C1 oil passage L6 at time T14, a drop in oil pressure that has been applied to the hydraulic servo of the clutch C1 is increased. If starting of the vehicle is requested in this period by turning on the accelerator, engagement of the clutch C1 is therefore delayed, which hinders smooth starting of the vehicle. In FIG. 6, "Pcg" represents the oil pressure Pc1 remaining in the hydraulic servo of the clutch C1 (friction engagement element) at time T4 when the state of the C1 relay valve 70 is switched.

The C1 relay valve 70 is structured so that the outer peripheral surface of the spool 74 slides on the inner peripheral surface of the sleeve 72. Due to this structure, there is slight clearance between the inner peripheral surface of the sleeve 72 and the outer peripheral surface of the spool 74. It is now assumed that the vehicle is traveling with the engine 12 being operated. In this case, the mechanical oil pump 42 is in operation, and therefore the C1 relay valve 70 is in the state where the input port 72*b* to which the output port oil passage L3 is connected communicates with the output port 72*e* to which the C1 oil passage L6 is connected, and the input port 72*d* to which the discharge port oil passage L5 is connected communicates with the drain port 72*f* to which the drain oil passage L7 is connected. In this state, when the vehicle is traveling at any one of the first to fourth forward speeds, the high SL1 pressure from the linear solenoid valve SL1 is applied to the hydraulic servo of the clutch C1 via the output port oil passage L3, the input port 72*b*, the output port 72*e*, and the C1 oil passage L6 (see FIG. 2). Accordingly, there may be a pressure difference between the output port 72*e* and the input port 72*c* adjoining the output port 72*e*, and oil in the output port 72*e* may leak to the input port 72*c* through the above clearance. In the present embodiment, the discharge port oil passage L5 connected to the input port 72*c* is held at a relatively high oil pressure by the set pressure of the check valve 80, and the pressure difference between the output port 72*e* and the input port 72*c* is small. The amount of oil leakage can therefore be reduced.

The hydraulic control device of the embodiment described above includes: the C1 relay valve 70 that allows the output port oil passage L3 (input port 72*b*) to which the SL1 pressure Psl1 from the linear solenoid valve SL1 is output to communicate with the C1 oil passage L6 (output port 72*e*) connected to the hydraulic servo (oil chamber) of the clutch C1 and allows the discharge port oil passage L5 (input port 72*d*) to which the discharge pressure from the electromagnetic pump 60 is output to communicate with the drain oil passage L7 (drain port 72*f*) when the signal pressure (modulator pressure Pmod) generated based on the line pressure PL is equal to or higher than the set pressure, and that shuts off communication between the discharge port oil passage L5 (input port 72*d*) and the drain oil passage L7 (drain port 72*f*) and allows the discharge port oil passage L5 (input port 72*c*) instead of the output port oil passage L3 (input port 72*b*) to communicate with the C1 oil passage L6 (output port 72*e*) when the signal pressure is lower than the set pressure; and the check valve 80 attached to the drain oil passage L7. In this hydraulic control device, the set pressure of the check valve 80 is adjusted to be lower than the maximum oil pressure obtained by the discharge capability of the electromagnetic pump 60 and higher than the SL1 pressure Psl1 (residual pressure Pre) remaining in the hydraulic servo of the clutch C1 when the state of the C1 relay valve 70 is switched after the engine 12 is stopped. If the automatic stop conditions for the engine 12 are satisfied, operation of the electromagnetic pump 60 is started before the state of the C1 relay valve 70 is switched. Therefore, before the state of the C1 relay valve 70 is switched, namely while the C1 relay valve 70 is in the state where the discharge port oil passage L5 communicates with the drain oil passage L7, the check valve 80 can be opened to discharge air in the electromagnetic pump 60 and in the discharge port oil passage via the drain oil passage L7 and the check valve 80, and the discharge port oil passage L5 can be held at a relatively high oil pressure. Accordingly, when the state of the C1 relay valve 70 is switched so that the discharge port oil passage L5 communicates with the C1 oil passage L6, an oil pressure higher than the SL1 pressure Psl1 (residual pressure Pre) remaining in the hydraulic servo of the clutch C1 immediately before the state of the C1 relay valve 70 is switched is introduced from the discharge port oil passage L5 into the hydraulic servo (oil chamber) of the clutch C1. This can suppress a drop in oil pressure being applied to the hydraulic servo (oil chamber) of the clutch C1. Accordingly, even if the subsequent request to start the vehicle is made immediately after the engine 12 is stopped, the clutch C1 can be quickly engaged, and the vehicle can be smoothly started. Moreover, the set pressure of the C1 relay valve 70 is adjusted so that the state of the C1 relay valve 70 is switched while the SL1 pressure Psl1 (residual pressure Pre) remaining in the hydraulic servo (oil chamber) of the clutch C1 is higher than the piston stroke end pressure Pse of the clutch C1. The oil pressure that is applied to the hydraulic servo of the clutch C1 before and after the state of the C1 relay valve 70 is switched can therefore be kept relatively high.

In the hydraulic control device of the embodiment, the set pressure of the check valve 80 is adjusted to be lower than the maximum oil pressure obtained by the discharge capability of the electromagnetic pump 60 and higher than the SL1 pressure Psl1 (residual pressure Pre) remaining in the hydraulic servo of the clutch C1 when the state of the C1 relay valve 70 is switched after the engine 12 is stopped. However, the preferred embodiment is not limited to this. The set pressure of the check valve 80 may be adjusted to any pressure within the range of the maximum oil pressure of the electromagnetic pump 60 as long as this pressure is equal to or higher than a target standby pressure of the starting friction engagement element (clutch C1) during a period in which the engine is stopped. The standby pressure may be specifically a stroke end pressure of the friction engagement element, a stroke start pressure thereof, or a pressure between the stroke start pressure and the stroke end pressure. In the case where the set pressure of the check valve 80 is the above standby pressure, the standby pressure is introduced from the discharge port oil passage L5 into the hydraulic servo (oil chamber) of the clutch C1 when the state of the C1 relay valve 70 is switched so that the discharge port oil passage L5 communicates with the C1 oil passage L6. This can suppress a significant drop in oil pressure being applied to the hydraulic servo (oil chamber) of the clutch C1.

In the hydraulic control device of the embodiment, the set pressure of the C1 relay valve 70 is adjusted so that the state of the C1 relay valve 70 is switched while the SL1 pressure Psl1 (residual pressure Pre) remaining in the hydraulic servo (oil chamber) of the clutch C1 is higher than the piston stroke end pressure Pse of the clutch C1. However, the preferred embodiment is not limited to this, and the set pressure of the C1 relay valve 70 may be adjusted so that the state of the C1 relay valve 70 is switched while the residual pressure Pre is equal to or lower than the piston stroke end pressure Pse. For example, in the case where the standby pressure required for the starting friction engagement element (clutch C1) when the engine is stopped is lower than the stroke end pressure (e.g., the stroke start pressure etc.), the set pressure of the C1 relay valve 70 is adjusted so that the state of the switch valve (C1 relay valve 70) is switched while the residual pressure Pre is higher than this standby pressure.

In the hydraulic control device of the embodiment, the drive pressure oil passage L2 is connected to the discharge port oil passage L5 via the bypass oil passage (the upstream side L8, the C1 relay valve 70, the downstream side L9, the check valve 82), but the hydraulic control device may not include the bypass oil passage. In this case, the hydraulic control device may not include the connection ports 72g, 72h and a fourth land 74d of the C1 relay valve and the check valve 82.

Figure 7:
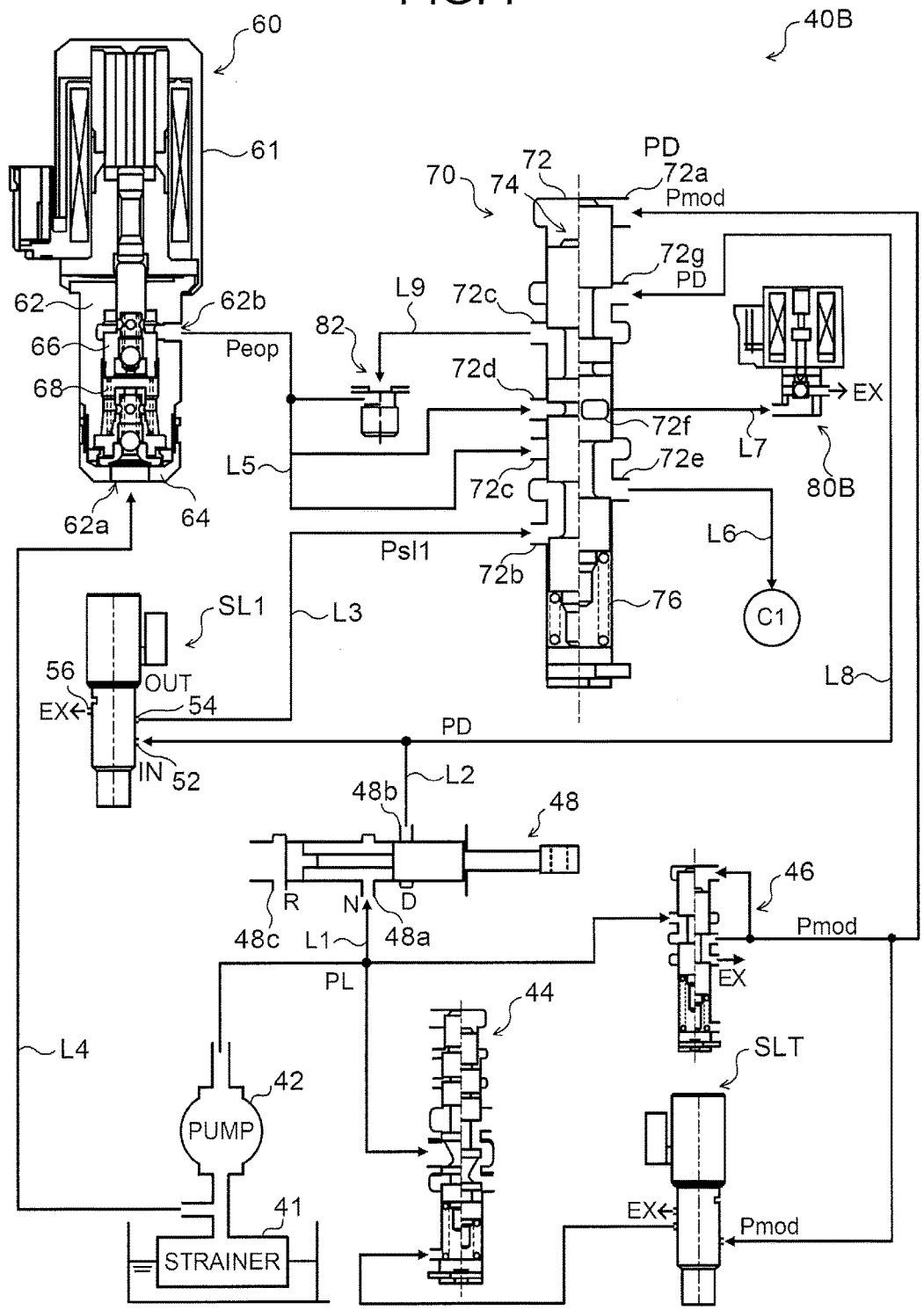
FIG. 7 is a configuration diagram schematically showing the configuration of a hydraulic circuit 40B of a modification.
Figure 8:
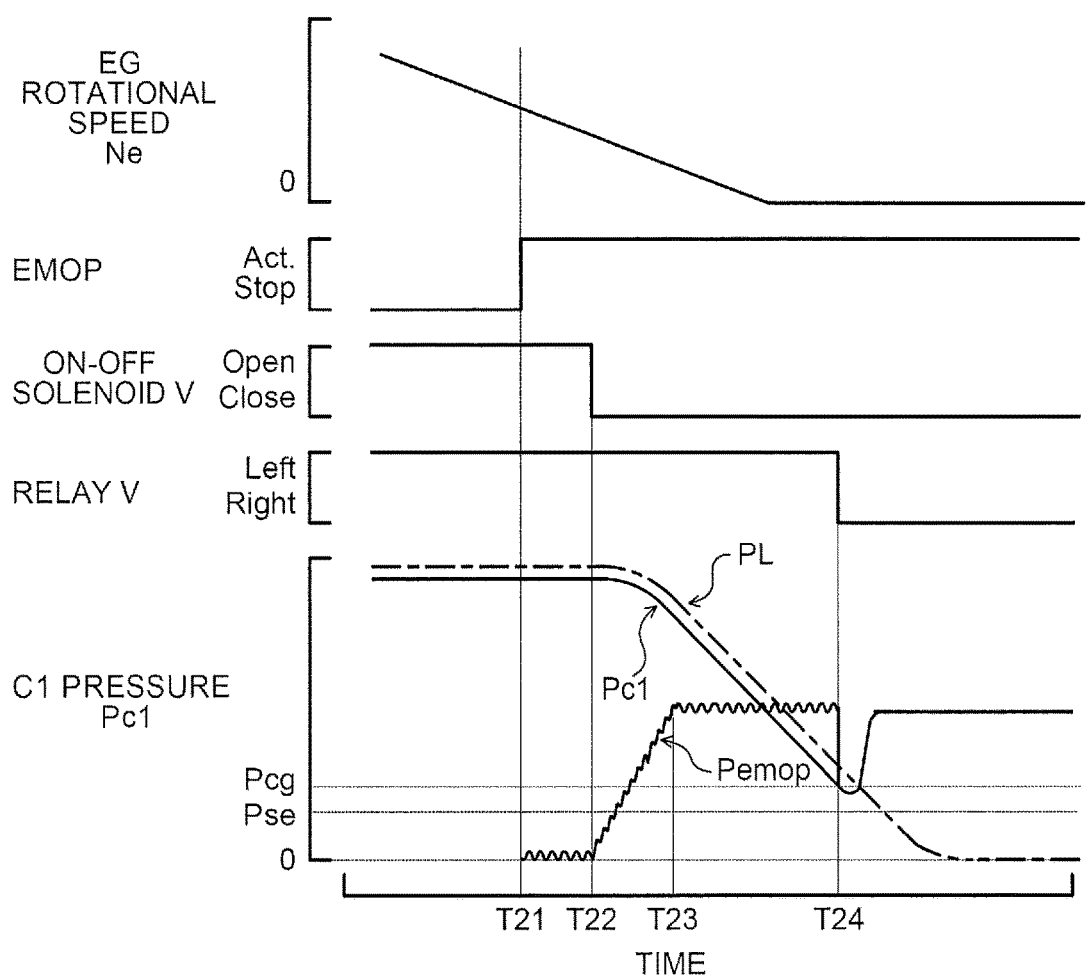
FIG. 8 is an illustration showing how the engine rotational speed Ne, the operating state of the electromagnetic pump 60, the operating state of an on-off solenoid valve 80B, the operating state of the C1 relay valve 70, the line pressure PL, the electromagnetic pump pressure Pemop, and the C1 pressure Pc1 change with time when the engine is stopped in the modification.

In the hydraulic control device of the embodiment, the check valve 80 is attached to the drain oil passage L7. However, as shown in a hydraulic circuit 40B of a modification in FIG. 7, the hydraulic control device may include instead of the check valve 80 an on-off solenoid valve 80B that opens and closes the discharge port of the drain oil passage L7. FIG. 8 is an illustration showing how the engine rotational speed Ne, the operating state of the electromagnetic pump 60, the operating state of the on-off solenoid valve 80B, the operating state of the C1 relay valve 70, the line pressure PL, the electromagnetic pump pressure Pemop, and the C1 pressure Pc1 change with time when the engine is stopped in the modification. In the hydraulic circuit 40B of the modification, when the engine 12 is in operation, the on-off solenoid valve 80B is opened to open the discharge port of the drain oil passage L7. In the modification, the on-off solenoid valve 80B is opened at the timing when the engine 12 is in operation. However, the preferred embodiment is not limited to this. The on-off solenoid valve 80B needs only to be opened at least when the electromagnetic pump 60 is in operation. The on-off solenoid valve 80B may be opened at the timing when the automatic stop conditions for the engine 12 are satisfied or at the timing when operation of the electromagnetic pump 60 is started. If the automatic stop conditions are satisfied and the engine 12 is stopped, operation of the electromagnetic pump 60 is started (time T21) before the state of the C1 relay valve 70 is switched. Air in the electromagnetic pump 60 and in the discharge port oil passage L5 is thus discharged together with hydraulic oil therein via the drain oil passage L7. After a predetermined time has passed since the start of operation of the electromagnetic pump 60, the on-off solenoid valve 80B is closed to close the discharge port of the drain oil passage L7 (time T22). As used herein, the "predetermined time" is the time required for discharge of the air to be completed after operation of the electromagnetic pump 60 is started, and can be obtained in advance by experiments etc. If the electromagnetic pump 60 is operated with the discharge port of the drain oil passage L7 being closed by the on-off solenoid valve 80B, the oil pressure in the discharge port oil passage L5 increases relatively quickly. In the modification, the timing (time T21) when operation of the electromagnetic pump 60 is started can be determined so that the timing (time T23) when the oil pressure in the discharge port oil passage L5 finishes increasing after the on-off solenoid valve 80B is closed is earlier than the timing (time T24) when the state of the C1 relay valve is switched, by back-calculating, from the time at which the oil pressure in the discharge port oil passage L5 finishes increasing, the time it takes for air in the discharge port oil passage L5 to be discharged after operation of the electromagnetic pump 60 is started and the time it takes for the oil pressure in the discharge port oil passage L5 to finish increasing. Accordingly, if the signal pressure (modulator pressure Pmod) is lower than the set pressure of the C1 relay valve 70 and the C1 relay valve 70 is switched to the state where the discharge port oil passage L5 communicates with the C1 oil passage L6 at time T24, a relatively high oil pressure (electromagnetic pump pressure Pemop) in the discharge port oil passage L5 can be applied to the hydraulic servo of the clutch C1 via the C1 oil passage L6. This can suppress a drop in oil pressure that is applied to the hydraulic servo (oil chamber) of the clutch C1.

Correspondence between the main elements of the embodiment and the main elements of the preferred embodiment described in the section "SUMMARY" will be described below. In the embodiment, the engine 12 corresponds to the "motor," the automatic transmission 30 corresponds to the "automatic transmission," the starting friction engagement element corresponds to the "clutch C1," the mechanical oil pump 42 corresponds to the "mechanical pump," the electromagnetic pump 60 corresponds to the "electric pump," the C1 relay valve 70 corresponds to the "switch valve," the check valve 80 corresponds to the "drain on-off valve," and the ATECU 16 corresponds to the "control unit."

As used herein, the "motor" is not limited to the engine 12 serving as an internal combustion engine, but may be any type of motor such as an electric motor. The "automatic transmission" is not limited to the 6-speed automatic transmission 30 having the first to sixth forward speeds, but may include automatic transmissions having any number of shift speeds such as a four-speed automatic transmission, a five-speed automatic transmission, and an eight-speed automatic transmission. The "electric pump" is not limited to the electromagnetic pump 60, but may be any pump that is supplied with electric power and operated by the electric power to generate an oil pressure, such as an electric pump that is operated by power from an electric motor. The correspondence between the main elements of the embodiment and the main elements of the invention described in the section "SUMMARY" is shown by way of example in order to specifically describe the best mode for carrying out the invention described in the section "SUMMARY" based on the embodiment, and is not intended to limit the elements of the invention described in the section "SUMMARY." That is, the invention described in the section "SUMMARY" should be construed based on the description in the section "SUMMARY," and the embodiment is merely a specific example of the invention described in the section "SUMMARY."

Although the mode for carrying out the preferred embodiment is described above based on the embodiment, it should be understood that the present invention is not limited in any respect to the embodiment, and can be carried out in various forms without departing from the spirit and scope of the present invention.

INDUSTRIAL APPLICABILITY

The present invention is applicable to the manufacturing industry of hydraulic control devices.

The invention claimed is:

1. A hydraulic control device configured to be mounted on a vehicle including a motor and configured to control an oil pressure for hydraulic friction engagement elements in an automatic transmission that shifts power from the motor via the friction engagement elements to transmit the shifted power to an axle side, comprising:

a mechanical pump configured to be operated by the power from the motor to generate an oil pressure;

an electric pump configured to be supplied with electric power and operated by the electric power to generate the oil pressure;

a switch valve configured to be operated by a signal pressure generated based on the oil pressure from the mechanical pump, that attains, when the signal pressure is equal to or higher than a predetermined pressure, a first state where the switch valve opens a path from the mechanical pump to an oil chamber of a starting friction engagement element, opens a path from the electric pump to a drain oil passage, and closes a path from the electric pump to the oil chamber of the starting friction engagement element, and that attains, when the signal pressure is lower than the predetermined pressure, a second state where the switch valve opens the path from the electric pump to the oil chamber of the starting friction engagement element, closes the path from the mechanical pump to the oil chamber of the starting friction engagement element, and closes the path from the electric pump to the drain oil passage;

a drain on-off valve that is configured to be opened to drain oil in the drain oil passage when an oil pressure in the drain oil passage is equal to or higher than a set pressure, and that is configured to be closed to prevent draining of the oil in the drain oil passage when the oil pressure in the drain oil passage is lower than the set pressure; and a control unit that is configured to control the electric pump so that, when the motor is stopped, operation of the electric pump is started before the switch valve switches from the first state to the second state, wherein the set pressure of the drain on-off valve is determined as an oil pressure lower than a maximum oil pressure that is generated by the electric pump and equal to or higher than a standby pressure of the starting friction engagement element as a pressure during a period in which the motor is in the stopped state.

2. The hydraulic control device according to claim 1, wherein the set pressure of the drain on-off valve is determined as an oil pressure higher than an oil pressure of the starting friction engagement element in the first state at the time the switch valve switches from the first state to the second state.

3. The hydraulic control device according to claim 1 wherein the predetermined pressure of the switch valve is determined so that the switch valve switches from the first state to the second state while an oil pressure higher than a piston stroke end pressure remains in the oil chamber of the starting friction engagement element.

4. The hydraulic control device according to claim 1, wherein the electric pump is an electromagnetic pump that generates an oil pressure by reciprocating a piston by application and non-application of an electromagnetic force.

* * * * *